(No Model.) 2 Sheets—Sheet 2.

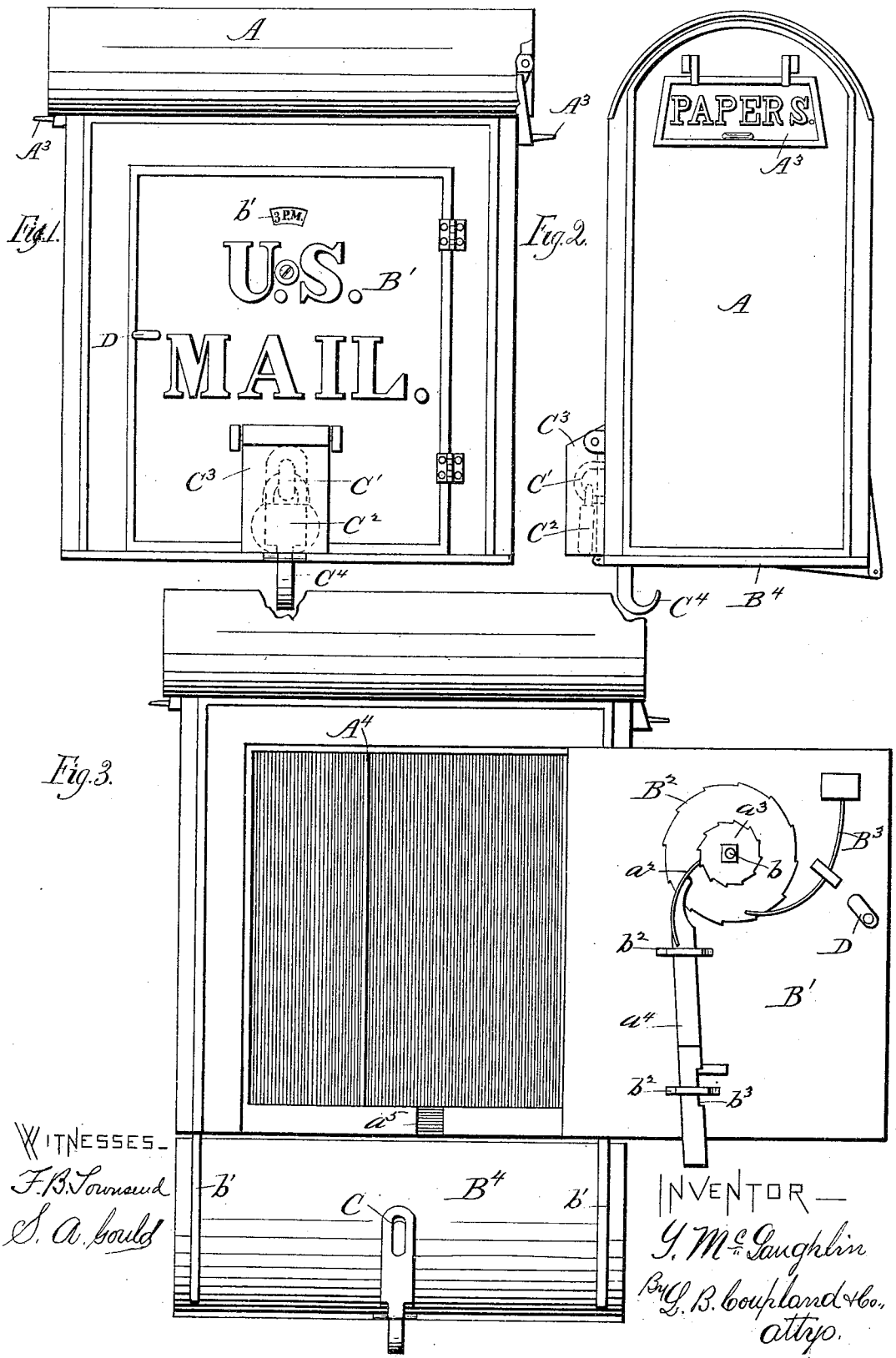

T. McLAUGHLIN.
STREET LETTER BOX.

No. 252,842. Patented Jan. 24, 1882.

WITNESSES.
F. B. Townsend
S. A. Gould

INVENTOR.
T. McLaughlin
By L. B. Coupland & Co.,
attys.

UNITED STATES PATENT OFFICE.

TERRY McLAUGHLIN, OF CHICAGO, ILLINOIS, ASSIGNOR OF ONE-HALF TO JOSIAH J. MYERS, OF SAME PLACE.

STREET LETTER-BOX.

SPECIFICATION forming part of Letters Patent No. 252,842, dated January 24, 1882.

Application filed March 18, 1881. (No model.)

*To all whom it may concern:*

Be it known that I, TERRY McLAUGHLIN, of Chicago, in the county of Cook and State of Illinois, have invented certain new and useful Improvements in Mail-Boxes; and I do hereby declare the following to be a full, clear, and exact description thereof, that will enable others to make and use the same, reference being had to the accompanying drawings, and to letters of reference marked thereon, forming a part of this specification.

This invention relates to improvements in that class of letter or mail boxes which are placed upon the street for the collection of mail-matter; and it consists of certain novel features in the construction and arrangement of the several parts, as will be hereinafter more fully set forth and described in detail.

Figure 4:
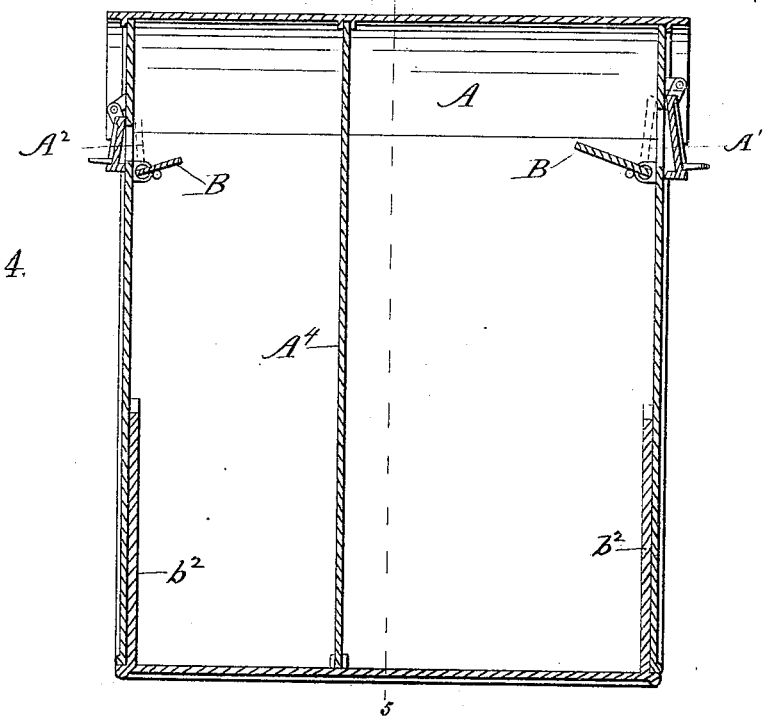

Figure 1 is a front elevation of a mail-box embodying my improvements; Fig. 2, an end elevation; Fig. 3, a view of the interior; Fig. 4, a vertical central longitudinal section; and Fig. 5, a vertical transverse section in the plane 5 5, Fig. 4.

Referring to the drawings, A represents the box proper, which may be of any particular form convenient for the purpose. The ends of the box are provided at a point near the arched top with the apertures $A'$ and $A^2$, the larger opening $A'$ being for the reception of newspapers and similar packages, while the smaller opening $A^2$ in the opposite end is more especially intended for letters. These apertures are covered by the usual drop-covers, $A^3$, to prevent the entrance of dust, rain, &c. The letters and papers are kept separate by means of the vertical removable partition $A^4$, as shown in Figs. 3 and 4 of the drawings.

The apertures provided for the insertion of the mail-matter are closed from the inside by the leaves B, hinged at both ends, and prevented from dropping below the position shown in Fig. 4 of the drawings by the pins or stops $a$, inserted in the hinges $a'$. When the box fills up, the matter will work up against the under side of these leaves and serve to close the mail-receiving apertures for the purpose of preventing the mail-matter from being improperly abstracted at these points.

The door $B'$, hinged to the front part of the box, opens out in the manner shown in Fig. 3 of the drawings. On the inside of this door is arranged the mechanism for indicating the hour when the mail was or will be collected. The reverse side of the dial-plate $B^2$ bears the proper indicating characters to represent the different hours of the day. The edge of the dial-plate is notched for the engagement of the spring-stop $B^3$, which prevents the dial from moving backward. The pawl $a^2$ engages with the ratchet-wheel $a^3$, and is attached to the pawl-lever $a^4$. The dial and ratchet-wheel rotate on the bolt $b$. The pawl-lever $a^4$ is supported in position by the brackets $b^2$. The edge of the lever working through the lower bracket is provided with the rectangular notch $b^3$, which serves, by engagement with the lower bracket, to prevent the lever $a^4$ from moving beyond the required point either up or down. When the door $B'$ is closed the lower part of the pawl-lever $a^4$ fits into the recess $a^5$.

The flap or bottom $B^4$ of the box is hinged to the back part, and drops down from the front, as shown in Fig. 3 of the drawings. When the flap $B^4$ is dropped down the pawl lever $a^4$ also drops, allowing the lower end to project a little below the bottom of the box, so that when the flap is closed up it comes in contact with the lower end of the lever $a^4$, forces it upward, and thereby causes the dial $B^2$ to be automatically rotated to the next position, showing what hour the mail has been or will be next collected, which hour may be known from observation through a transparent opening, $b'$, near the top of the door $B'$, as shown in Fig. 1 of the drawings.

Near the inside ends of the flap $B^4$ are attached the end pieces, $b^4$, which close up on the inside of the box, as shown in Fig. 4 of the drawings, and serve to prevent the mail-matter from dropping off the ends of the flap when the same is dropped down for the purpose of discharging the contents of the box into the mail-sack.

Figure 5:
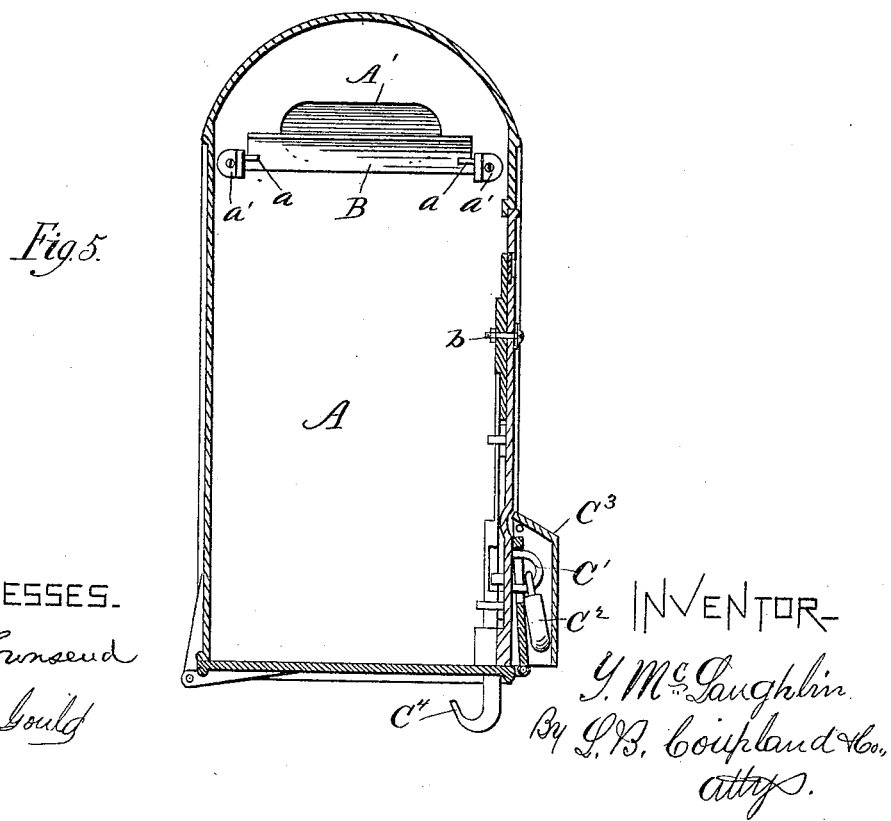

The hasp C, attached to the edge of the flap $B^4$, hooks up over the staple $C'$, inserted in the door $B'$, both the door and the flap being locked by the one padlock $C^2$, as shown in Fig. 5 and by the dotted lines in Figs. 1 and 2 of the drawings.

Hinged to the outside of the door $B'$ is the box $C^3$, which is adapted to be thrown upward when the mail-box is to be unlocked, and is turned down over the lock to protect the same from the changes of the weather, as during the winter season the locks get wet, are frozen, and many have to be broken before access can be had to the mail-box.

Attached to the under side of the flap $B^4$ is the hook-projection $C^4$, which is intended for the purpose of receiving the handle and holding one side of the sack carried by the person collecting the mail. The door $B'$ is further secured by the thumb-latch D, which need not be opened except when it is necessary to have access to the interior of the mail-box for purposes other than that of collecting the mail.

Having thus described my invention, what I claim, and desire to secure by Letters Patent, is—

In a mail-box of the character hereinbefore described, the combination, with the door $B'$ and the bottom flap, $B^4$, both being secured to box proper by one and the same lock, of the dial-plate $B^2$, the ratchet-wheel $a^3$, the spring-lock $B^3$, the pawl $a^2$, and the vertical lever $a^4$, all constructed, arranged, and operating substantially as and for the purpose set forth.

TERRY McLAUGHLIN.

Witnesses:
J. J. MYERS,
L. M. FREEMAN.